United States Patent [19]
Bussard

[11] 3,873,445
[45] Mar. 25, 1975

[54] APPARATUS FOR REDUCING TOILET EFFLUENTS TO USEABLE LIQUIDS

[75] Inventor: Willis A. Bussard, San Francisco, Calif.

[73] Assignee: Altair Industries, Inc., San Francisco, Calif.

[22] Filed: Dec. 5, 1972

[21] Appl. No.: 312,303

[52] U.S. Cl................ 210/149, 4/10, 210/181, 210/196, 210/206, 4/10;12;17;115;DIG. 3
[51] Int. Cl............................................. C02c 5/06
[58] Field of Search........... 210/149, 152, 177, 181, 210/196, 206, 220, 251, 259, 260, 167

[56] References Cited
UNITED STATES PATENTS

| | | |
|---|---|---|
| 2,153,345 | 4/1939 | Senyal.................................. 210/177 |
| 2,858,939 | 11/1958 | Corliss............................. 210/152 X |
| 3,175,688 | 3/1965 | Zink..................................... 210/149 |
| 3,327,855 | 6/1967 | Watson et al................... 210/152 X |
| 3,351,551 | 11/1967 | Sines............................... 210/206 X |
| 3,440,669 | 4/1969 | Boester.............................. 4/115 X |
| 3,487,015 | 12/1969 | Boester........................ 210/181 X |
| 3,543,294 | 11/1970 | Boester........................ 210/220 X |
| 3,715,304 | 2/1973 | Hefermehl..................... 210/149 X |

Primary Examiner—Charles N. Hart
Assistant Examiner—Robert H. Spitzer
Attorney, Agent, or Firm—Phillips, Moore, Weissenberger, Lempio & Strabala

[57] ABSTRACT

A toilet effluent-waste water system contained within a housing to form a self-contained portable unit, the system producing utility water from human waste by sequential treatment of said waste bacterially and chemically.

7 Claims, 4 Drawing Figures

APPARATUS FOR REDUCING TOILET EFFLUENTS TO USEABLE LIQUIDS

BACKGROUND OF THE INVENTION

This invention relates to the production of utility water from human waste material. This invention further relates to the production of utility water from human waste material on a small-scale basis.

The popularization of leisure-time activities has drawn increasing numbers of people to remote areas of the country where human waste disposal facilities are not readily available. The increased use of campers, boats, mobile homes, and other transport vehicles has also contributed to the problem of disposing of human waste in situations where conventional facilities are unavailable. At the same time, our growing awareness of delicate ecological balances, particularly in these remote areas, has created many restrictions on the disposal of untreated or partially treated human waste materials.

A concomitant problem in remote or mobile environments is the scarcity of water necessary for ordinary household use.

Although many prior art attempts have been made to provide waste disposal facilities which operate independently of conventional community sewage treatment facilities, such independently operable or "portable" facilities are frequently cumbersome, complicated, and/or expensive to maintain. Often, as in the case of chemical toilets, there is created the problem of disposing of reactants that are, at best, not beneficial to the environment. Further, known portable human waste disposal units have the typical disadvantage of being structurally and conceptually incapable of conserving water for household use, a scarce resource under most remote operating conditions.

Although the concept of recycling the processed utility water product of human waste has been recently advocated as an economical ecologically sound proposition, few practical systems have been proposed; further, these systems have typically been for large-scale treatment of raw sewage and thus have not confronted many of the difficulties encountered in creating a portable system with these features.

It is accordingly an object of this invention to provide a miniaturized system for the recycling of water produced from human waste.

It is a further object of this invention to provide a miniaturized system to produce utility water from the products of human waste.

It is an additional object of this invention to provide a miniaturized system for the recycling of water produced from human waste which is economical, sanitary, odorfree, and harmless to the environment.

It is another object of this invention to provide a miniaturized system for the recycling of water produced from human waste which is fully portable, winterizable, and adaptable for use in remote areas, cabins, boats, mobile homes, campers, and the like, as well as ordinary households.

Other objects and purposes of the invention will be obvious to those skilled in the art to which it pertains from the disclosure contained herein.

BRIEF SUMMARY OF THE INVENTION

Broadly, the invention comprises a sanitary apparatus for treating human waste to produce utility water by means of a combination of treatment areas which is easily contained in a small, lightweight container, thus rendering the unit portable and especially suitable for use in remote areas and on transportation devices, such as boats, trains, campers, and the like. According to this invention, human waste materials admixed with small quantities of flush water are first subjected to the action of aerobic bacteria; the liquid effluent produced thereby is then treated with chlorine to effect chemical destruction of harmful bacteria in the effluent, and the product filtered and stored until required for recycle or other utility use. As used in this application "utility water" refers to a water product having a purity in relation to bacteria count and a freedom from suspended solids sufficiently low to make such water acceptable, from a health and appearance standpoint, for use in recycle as flush water, or as discharge to the immediate environment for irrigation purposes and the like, or for feed water to high quality water treatment facilities.

DETAILED DESCRIPTION OF THE INVENTION

Figure 1:
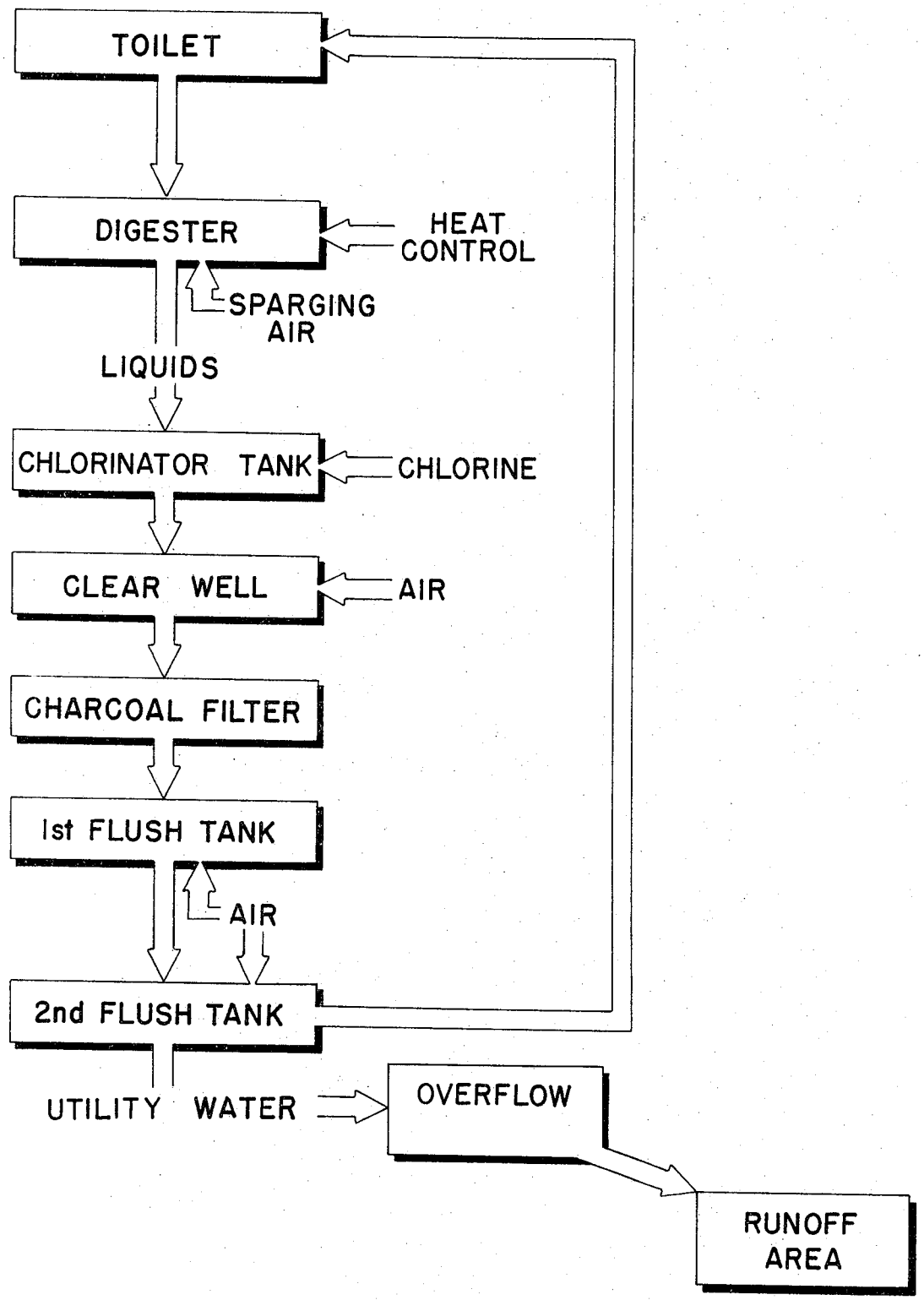
FIG. 1 is a flow-chart diagramming the treatment of human waste to yield utility water according to the process of this invention.
Figure 2:
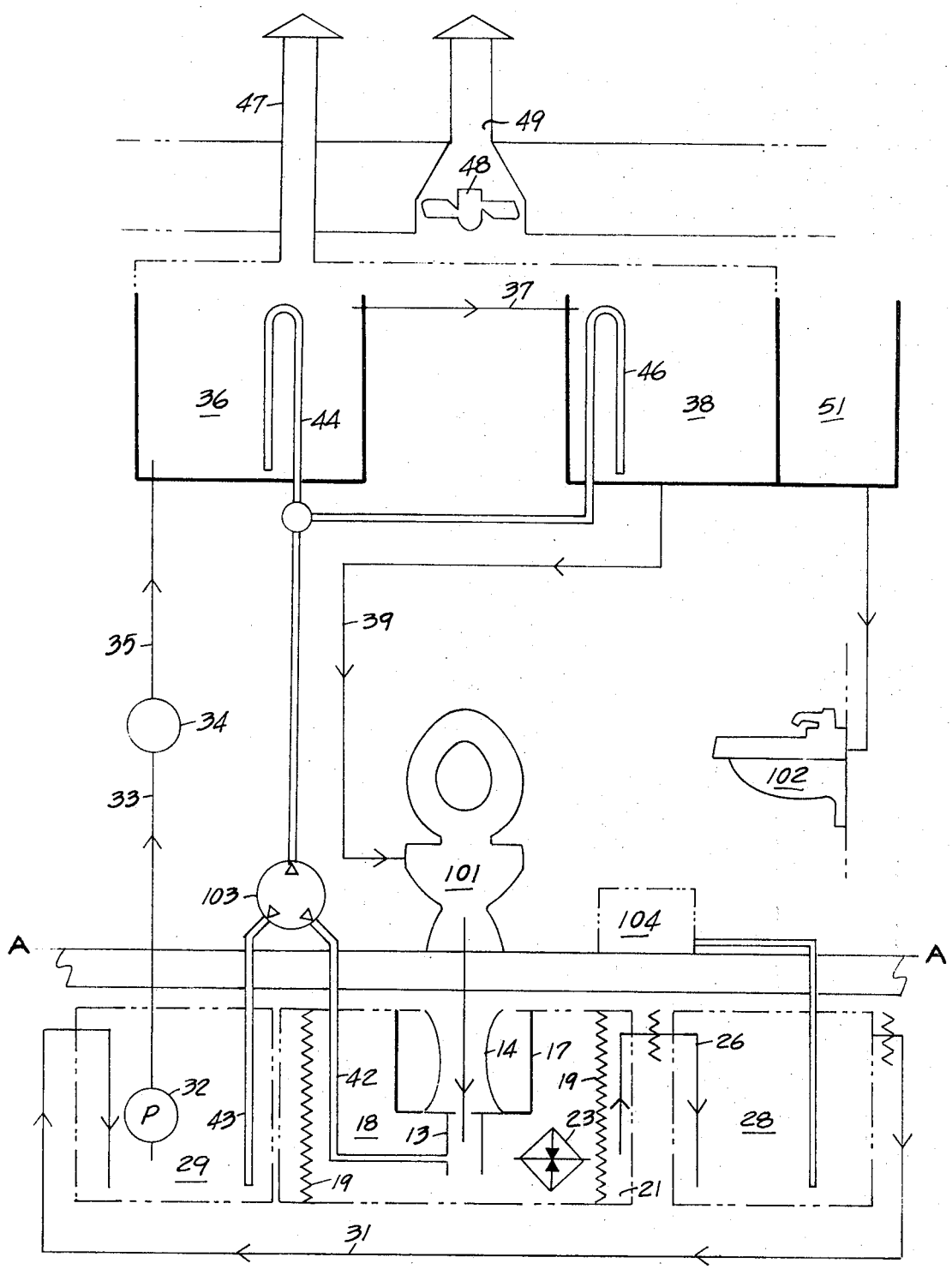
FIG. 2 is a schematic view of the successive treatment areas denoted in FIG. 1 compartmentalized for use as a portable unit according to this invention, wherein line A—A depicts the floor of the compartment.
Figure 3:
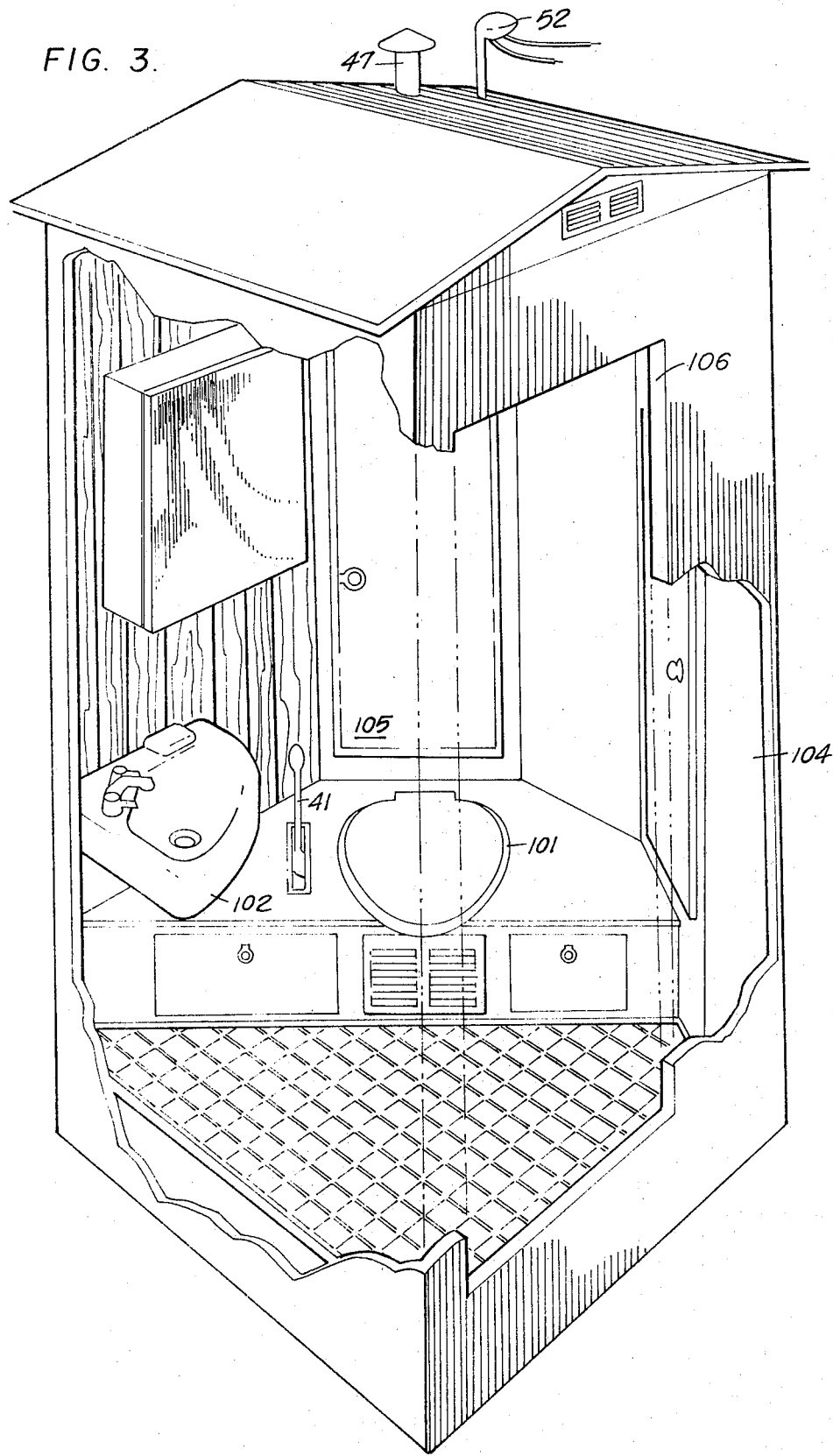
FIG. 3 illustrates the interior of the compartment as seen by the occupant with positions of the walls cut away, wherein numeral 101 denotes a toilet, numeral 102 denotes a sink, numeral 103 denotes an air compressor, numeral 104 a chlorinator, numeral 105 a cabinet containing controls for a fan, heat, lights and probes, and 106 refers to the doorway.
Figure 4:
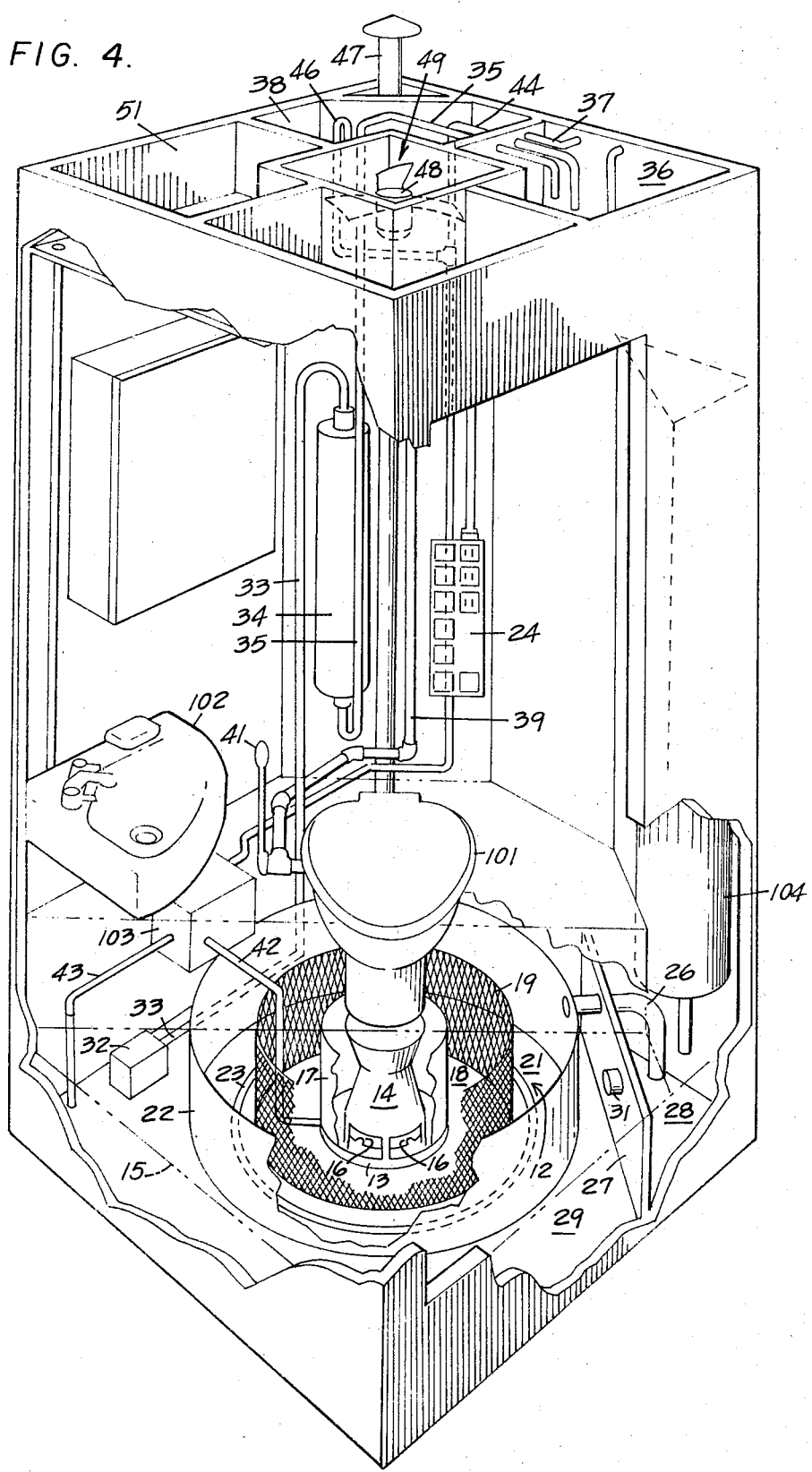
FIG. 4 is a view similar to FIG. 3 with addition of further cutaway portions to show the various tanks, digester, chlorinator, and clear well compartments, as well as positioning of the various controls, pipes and filter unit.

Referring to FIGS. 2, 3 and 4 human excreta or other human waste materials are emptied into toilet bowl 101, and on flushing with small amounts of water, the material is carried through suitable check valves (not shown) into digester 12; with solid waste falling onto air sparger 13 through a channel formed by venturi shaped baffle 14. Air sparger 13 comprises a flat disclike member which supports a plurality of air-pipes terminating in a plurality of air bubbler heads 16 arranged thereabout. A cylindrical baffle 17 surrounds venturi baffle 14 and is spaced apart therefrom with the bottom edge thereof resting on the outer periphery of sparger 13. The upper edge of venturi baffle 14 is somewhat lower than the upper edge of cylindrical baffle 17 and spaces for openings are provided near the bottom of venturi baffle 14 adjacent the sparger head in order to permit continuous circulation of the liquids and entrained solids within the volume confined by baffle 17.

Immediately surrounding circular baffle 17 is another digester volume 18 essentially cylindrical in shape whose periphery is defined by a gross solids filter baffle 19 which further confines any solids that escape from within cylindrical baffle 17. Filter baffle 19 reaches from the floor to the ceiling 15 of digester 12 and is of a rather coarse mesh to permit the free flow of liquids therethrough but generally confining growth solids within. Baffles 14 and 17 do not reach to the ceiling 15, whereby the liquids flow over the tops thereof when the volume of liquid contained within the enclosed spaces becomes sufficient to overflow the baffles.

External to filter baffle 19 is a further digester volume 21 similar in shape to volume 18. The periphery of the digester unit is defined by a wall 22 that isolates the digester structure from the surrounding tanks which form the bottom of the waste treatment unit. Wall 22 is sealed to the floor of the structure and in turn to the ceiling 15 of the bottom unit by suitable gasketing means and the other tanks subsequently described are sealed in a similar manner, except for air vents to the vent structure described hereinafter.

A resistance heater coil 23 is affixed to the floor of digester unit 12 and is supplied with electricity from electric panel 24 which is placed in the back of the middle compartment of the waste treatment unit.

An overflow pipe 26 is fixed through the upper portion of wall 22 and passes from thence through a wall 27 that separates chlorinator tank 28 from the clear well tank 29. As it passes into chlorinator tank 28, overflow pipe 26 is bent downwardly to terminate near the bottom of the chlorinator.

A chlorinator overflow pipe 31 is fixed through the upper portion of wall 27 permitting communication between chlorinator tank 28 and clear well tank 29. Clear well tank 29 comprises the entire peripheral portion of the bottom section of the waste treatment unit, except for that relatively small portion occupied by chlorinator tank 28.

All of the compartments, i.e. digester, chlorinator and clear well are completely isolated one from the other except for the various overflow pipes referred to above. If desired, suitable scum baffles may be provided in the pipes between the digester and the chlorinator and between the chlorinator and the clear well tank. A baffle of a mesh of about 100 is suitable for this purpose.

A clear well pump outlet 32 is provided within clear well tank 29 at a location remote from pipe 31. A pipe 33 connects the clear well outlet to the top of a filter unit 34 which is placed behind a panel in the back of the toilet compartment. A pipe 35 leads from the bottom of the filter unit up into the first flush tank 36 which is placed in the upper portion of the treatment structure. An overflow pipe 37 in turn connects a second flush tank 38 to the first flush tank.

A pipe 39 directs the utility water retained in the second flush tank back down to the toilet 101 through a flush mechanism actuated by handle 41. The handle 41 is also mechanically linked (not shown) to a chlorine tank held within chlorinator 104. Thus actuation of handle 41 releases the desired amount (about 1 quart) of water into the toilet bowl 101 and at the same time causes release of a predetermined amount (about three-fourths of an ounce of chlorine) from the chlorine tank to the chlorinator tank 28.

The digester 12 as well as chorinator tank 28 and clear well tank 29 are initially provided with a relatively small amount of liquid sufficient to charge the bottom portion of the system. The digester in addition is provided with a sufficient concentration of aerobic bacteria of the type normally found in common septic tanks to digest the waste material introduced therein. Similarly the second flush tank is provided with a sufficient amount of water to provide for flushing of the toilet a sufficient number of times until the entire unit is in recycle circulation.

Aeration necessary in the system for optimum bacteria activity, purification and odor control is provided by air compressor 103. This air compressor is capable of pumping approximately 1 cu.ft. of air per minute of which about three quarters is supplied to air sparger 13 in the digester through air pipe 42, while the other one quarter of the air pumped is supplied equally to clear well tank 29, first flush tank 36 and second flush tank 38 through pipes 43, 44 and 46, respectively. Exhaust air from all compartments passes through a divided vent structure 47 in the roof of the unit. The air supplied to clear well tank 29 and to flush tanks 36 and 38 serves to further oxidize any remaining oxidizable matter in the overflow from chlorinator tank 28 and also to remove any residual chlorine therefrom.

The main toilet compartment of the unit is furnished with a fan 48 to exhaust air therefrom via air outlet 49, while electrical power is supplied to the unit through the service connector 52.

The upper portion of the unit is also provided with a third tank 51 for the retention of city water. This tank in turn is connected to sink 102 which is available for handwashing and the like. The sink waste in turn is piped (not shown) into the digester 12 or alternatively, if permitted, is simply vented to the outside of the unit for irrigation purposes.

In order to optimize the digestion of the wastes, it is desirable to maintain the digester temperature at from about 80°F to about 95°F. It is even more preferable to maintain this temperature from about 85°F to 91°F. In order to maintain as even a temperature as possible and to provide additional comfort for the occupant, the entire unit is well insulated, e.g. with a foamed insulation in the walls, roof and floor and, of course, a door (not shown) is provided in doorway 106. This insulation (not shown) is especially thick in the walls surrounding the lower portion of the unit wherein the digester, chlorinator and clear well tanks reside. Heat to the digester 12 is supplied by resistance heater coil 23 and is controlled to maintain the digester temperature within the desired range. For this purpose, a standard thermostat (not shown) is located within the digester 12.

The waste material is retained within the digester for a period of time sufficient to effect digestion of the waste thereby permitting subsequent effective purification of the product liquid effluent within the chlorinator tank 28. Of course, solid material such as feces will be retained in the digester 12 until sufficiently liquified to pass through filter baffle 19 as well as the scum baffle in overflow pipe 26. The filter baffle 19 is of a mesh, for instance about 30, sufficiently fine to entrap undesirable large particles in suspension in the liquid in the digester and further to prevent them from passing through into the chlorinator tank 28.

The overflow liquid effluent from digester 12 is retained in chlorinator tank 28 for a sufficient period of time to effect the desired degree of chlorination and to further purify the effluent. For example, the effluent in tank 28 is preferably at about 85°F (the temperature of the liquid overflowing from the digester), and at this temperature a retention time of about 30 minutes will generally suffice.

The chlorinated effluent is then overflowed by gravity through pipe 31 into the clear well tank 29. There the effluent is allowed to stand to permit settling of any macroscopic particles in the effluent and further permit the chlorine to effectively reduce the bacteria count. The liquid effluent is then pumped through filter unit 34 for further clarification and microscopic particle removal. Preferably the filter material comprises charcoal or activated carbon and is perhaps 5 inches in diameter while being about 36 inches long.

Water level detection probes are provided in clear well tank 29 and signal a pump located behind clear well pump outlet 32 when the liquid level within the clear well tank reaches a level sufficient to permit pumping liquid up through filter 34 into the flush tanks in the top of the unit.

Under certain conditions and in some climates, it is possible that digester temperatures may exceed the optimum range stated above. Should such conditions be expected, conventional equipment may be installed in conjunction with the air compressor 103 to provide for cooling of the air supplied to the digester.

It is of importance for the effective use of this invention as a sanitary portable unit for producing purified water end products of human waste that the required proportions be maintained between the various processing areas to insure complete purification of the liquid waste to meet health code standards, and that the capacities of these areas be substantially as herein disclosed to insure useful portability of the container unit.

For instance, in one referred embodiment, the digester tank capacity is about 50 gallons. Preferably, in such a unit, the chlorinator tank 28 has a capacity of about 6 gallons, and the clear well tank a capacity of about 44 gallons. The air compressor is preferably adjusted to supply about 3 cu.ft. of air to the digester per hour for each gallon of toilet effluent to be treated, with a desirable maximum compressor capacity of about 1 cu. ft. per minute.

By maintaining the temperature of the digester at about 85°F to about 91°F, and the temperature of the contents of the chlorinator tank at about 85°F, and observing the above conditions, a cycle completion time of about 2 hours per unit of biomass will obtained. Thus this embodiment is capable of treating up to about 25 gallons of biomass per hour, or about 600 gallons of biomass per 24 hour day. Operated at maximum capacity, the system will supply sufficient utility water to operate the unit, with a certain amount of this supply returned to the system by the flushing operation, which is adjusted to supply about one quart of water per flushing, while the excess utility water is sent to an external retention tank or ground filter or, more preferably, utilized for local irrigation purposes.

It has been found that the air requirements of the system will vary according to the waste material to be treated. As noted above, sewage effluent will require about 3 cu.ft. of air per hour per gallon to sustain endogenous respiration of the bacteria in the digester and encourage new cell synthesis, as well as to purify effluent in the other treatment areas supplied by air conduits 43, 44 and 46 (FIG. 2). This oxygen requirement may be expressed in terms of biochemical oxygen demand (BOD); various other waste materials may be evaluated in terms of their BOD requirement. Typical toilet wastes have a BOD value of about 0.10 lbs./100 gallons.

To effectively aerate the system and maintain an active bacteria population, 0.530 lbs. oxygen per hour per pound of BOD are required, plus an additional 0.166 lbs. oxygen per hour per pound of mixed liquor volatile suspended solids under aeration (MLVSS). Thus, the air requirements of the system may be determined according to the waste quantity input expected and varied accordingly. Additionally, it may be desirable to reduce the chlorine concentration in the chlorinator tank if human excreta is not the sole source of waste.

It is preferably to construct the container and the chambers of lightweight material for ease of portability. For example, fiberglass material is excellent for outer container in all tanks and digester in the unit as well as the walls of the entire structure itself. Of course, the unit may be constructed of conventional wooden insulated panels, with plastics and/or fiberglass being reserved for the tanks and digester.

It is also desirable to fully and heavily insulate the unit, especially around the digester and chlorinator tank areas. This may be accomplished by utilizing foamed insulation in all exterior panels and walls as well as in the tank walls themselves. The piping system is advantageously comprised of PVC pipe of suitable dimension: for example, PVC pipe of about 1 to about 2 inches in diameter will in most instances be appropriate.

Of course, check valves are installed at outlets and inlets where appropriate in the piping and tank system to preserve the indicated one-way flow and prevent back-up in the system. In addition, suitable pump-out valves and pipes are provided to the digester and other tanks, so that the liquids and solids may be sampled or removed therefrom when the unit is serviced. The component chambers as described herein may readily be contained within an outer container of about 9 feet in height, 4 feet in width, and 4 feet in depth, with adequate room for the occupant and necessary or desirable accountrements such as a control panel, piping, toilet, sink, mirror, towel rack, and the like.

I claim:

1. A toilet waste septic system contained within a housing to form a portable unit, said septic system producing utility water from the products of human waste, and comprising:

a first treatment area consisting of a digester provided with aerobic bacteria in sufficient quantities to digest the introduced waste products;

temperature control means connected to said first treatment area to maintain the temperature of said digester at from about 80°F to about 95°F;

liquid communicating means from said first treatment area to a second treatment area consisting of a chlorinated retention tank having a chlorine content sufficiently high to purify liquid effluent introduced therein from the first treatment area, said chlorinated retention tank being connected to a chlorine tank for the supply of chlorine thereto;

liquid communicating means from said second treatment area to a third treatment area consisting of a clear well tank;

liquid communicating means from said third treatment area to fourth treatment area consisting of a filter;

liquid communicating means from said fourth treatment area to a first storage and flush tank;

liquid communicating means from said first storage tank to a second storage and flush tank;

an air compressor in operable connection with the digester, clear well and storage tanks to supply air below the surface of liquids therein to thereby support aerobic bacterial action in the digester and to remove excess chlorine from liquids in said clear well and storage tanks so as to permit continued bacterial action in said digester.

2. The septic system of claim 1, wherein the temperature of said digester is maintained at from 85°F to 91°F.

3. The septic system of claim 1 wherein the first treatment area is surrounded by insulation.

4. A self-contained portable sanitation unit for treating toilet wastes comprising a toilet enclosed within an enclosure, an aerobic bacterial digester disposed within the enclosure and connected to said toilet for receiving wastes therefrom, temperature regulating means disposed in said digester, means disposed in said enclosure to introduce sparging air into said digester, a chlorinated retention tank, a filter in liquid communication with said clear clear well tank, at least one storage and flush tank in liquid communication with said filter, means associated with said clear well tank and said flush tank to purge excess chlorine from the liquids therein and reduce the chlorine to a level that will permit continued bacterial action in said digester, and means to cycle digested oxidized, clarified sanitized waste was to said flush tank and back through said toilet.

5. The unit of claim 4 wherein the temperature regulating means comprises a regulated heating unit disposed within said digester.

6. The unit of claim 4 wherein said sparging air means comprises an air compressor, and a sparging head disposed below the surface of any liquids in said digester, and air conduits communicating said compressor to said sparger head.

7. The unit of claim 4 wherein said air compressor is additionally connected to air bubblers disposed below the surface of any liquids in the clear well tank and the storage and flush tank.

* * * * *

UNITED STATES PATENT AND TRADEMARK OFFICE
CERTIFICATE OF CORRECTION

PATENT NO. : 3,873,445
DATED : March 25, 1975
INVENTOR(S) : Willis A. Bussard

It is certified that error appears in the above–identified patent and that said Letters Patent are hereby corrected as shown below:

Claim 4, line 8, after "tank," insert -- a clear well tank in liquid communication with said chlorinated retention tank, -- ; Claim 4, line 9, delete first "clear".

Signed and Sealed this twenty-seventh Day of April 1976

[SEAL]

Attest:

RUTH C. MASON
Attesting Officer

C. MARSHALL DANN
Commissioner of Patents and Trademarks